United States Patent
McIntosh

(10) Patent No.: US 10,501,916 B2
(45) Date of Patent: Dec. 10, 2019

(54) VEHICLE GALLEY DRAINAGE SYSTEMS AND METHODS

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/646,143

(22) Filed: Jul. 11, 2017

(65) Prior Publication Data

US 2019/0017254 A1 Jan. 17, 2019

(51) Int. Cl.
| | |
|---|---|
| *E03C 1/26* | (2006.01) |
| *B01D 15/08* | (2006.01) |
| *B01D 35/28* | (2006.01) |
| *B64D 11/04* | (2006.01) |
| *E03C 1/182* | (2006.01) |
| *E03C 1/264* | (2006.01) |

(52) U.S. Cl.
CPC ................ *E03C 1/26* (2013.01); *B01D 15/08* (2013.01); *B01D 35/28* (2013.01); *B64D 11/04* (2013.01); *E03C 1/182* (2013.01); *E03C 1/264* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,123,092 | A | * | 7/1938 | Behrman ............... C01B 32/354 |
| | | | | 210/794 |
| 6,012,678 | A | | 1/2000 | Hale |
| 6,346,191 | B1 | * | 2/2002 | Morris .................... A47J 47/20 |
| | | | | 210/164 |
| 8,011,033 | B2 | | 9/2011 | Wierenga |
| 8,185,983 | B2 | | 5/2012 | Wierenga |
| 9,440,316 | B2 | | 9/2016 | McIntosh |
| 2014/0117126 | A1 | * | 5/2014 | Ceru ..................... E03C 1/2665 |
| | | | | 241/23 |
| 2015/0159909 | A1 | | 6/2015 | Vue |
| 2015/0275488 | A1 | * | 10/2015 | McIntosh ................. B23P 6/00 |
| | | | | 4/652 |

* cited by examiner

*Primary Examiner* — Ryan B Huang
(74) *Attorney, Agent, or Firm* — Joseph M. Butscher; The Small Patent Law Group, LLC

(57) ABSTRACT

A drainage system for a galley of a vehicle includes a sink that is configured to receive a colored liquid. A liquid pigment remover is in fluid communication with the sink. The liquid pigment remover is configured to remove color from the liquid. A drain is in fluid communication with the liquid coloration. The drain is configured to pass the liquid overboard from the vehicle after the color is removed (or partially removed) from the liquid by the liquid pigment remover. The drainage system may also include a strainer that is configured to strain particulates from the liquid before the liquid passes overboard out of the vehicle.

20 Claims, 6 Drawing Sheets

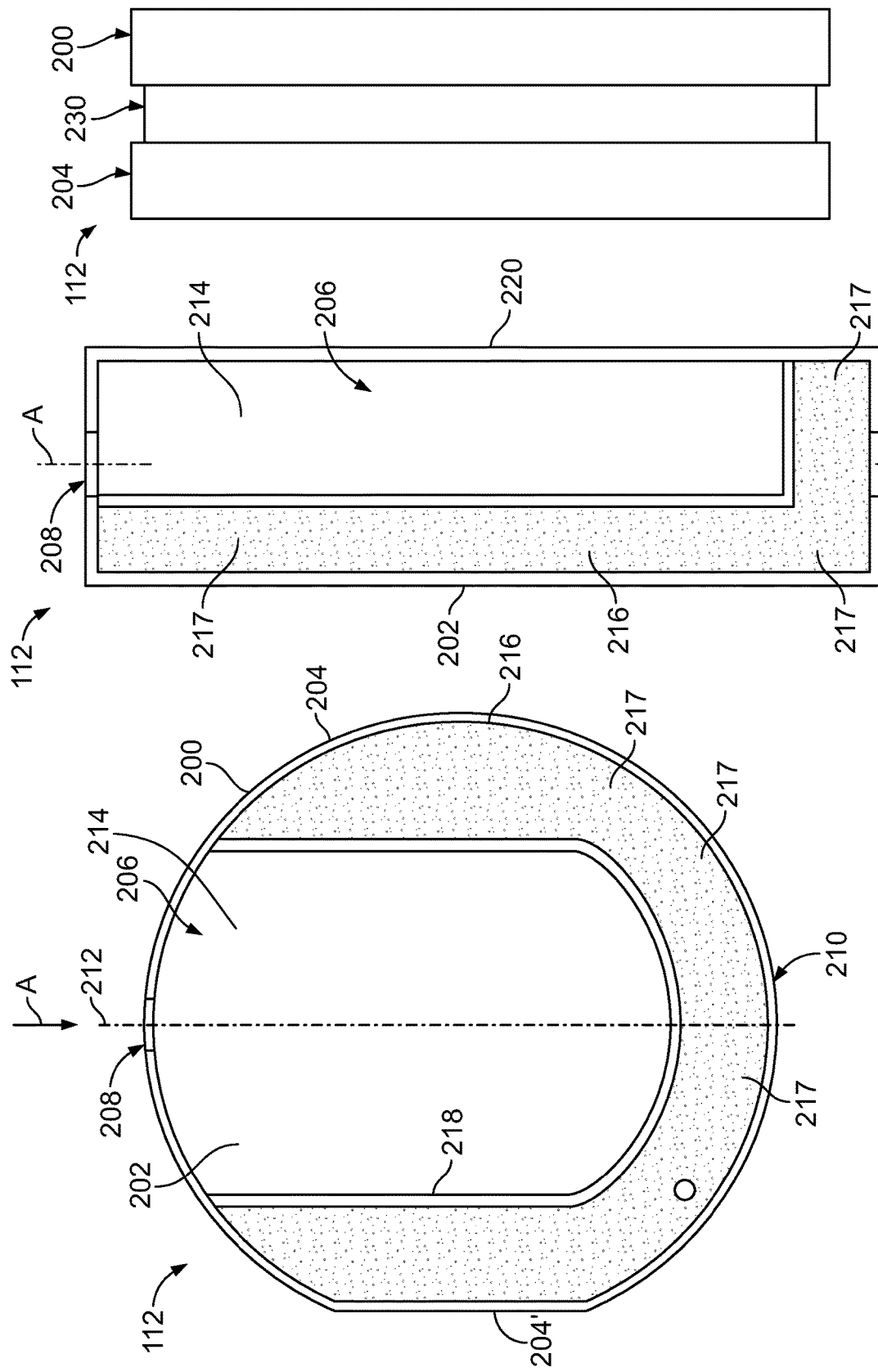

VEHICLE GALLEY DRAINAGE SYSTEMS AND METHODS

FIELD OF THE DISCLOSURE

Embodiments of the present disclosure generally relate to drainage systems and methods for galleys onboard vehicles, and, more particularly, to drainage systems and methods for galleys that filter liquids to remove coloration therefrom.

BACKGROUND OF THE DISCLOSURE

Various passenger vehicles, for example, aircraft, trains, and ships, are equipped to serve food and beverages to passengers. To facilitate such services, the vehicles may include galleys in which the food and beverages are handled. A typical galley includes a catch basin (or sink) that is configured to allow convenient disposal of waste fluids. A plumbing system coupled to the sink may also include a removable drain strainer that strains debris and particulates from the waste fluids, thereby preventing clogs and other associated plumbing problems. The drain strainer provides a trap or a settling tank for grease, food particles, and other such debris and particulates.

Colored liquids such as red wine, coffee, cola, and the like are often poured into a sink of a galley. For example, during a flight of a passenger aircraft, an attendant may pick up unfinished drinks from passengers (such as before the aircraft lands) and pour the unfinished drinks down a drain of the sink. The colored liquid drains through an overboard drain mast of the aircraft. It has been found that with certain aircraft, for example, the drained colored liquids may stain portions of an exterior fuselage. In particular, aircraft having white or light-colored fuselages may be particularly prone to stains from colored liquids that drain through a drain mast.

In order to prevent such colored liquids from staining exterior portions of the aircraft, some flight attendants may consider disposing colored liquids via a toilet in a lavatory. As such, a flight attendant would need to separately transport the liquid to the lavatory, pour the liquid into the toilet, and then flush the toilet. As can be appreciated, such a practice is not user-friendly, and is inefficient, inconvenient, and time-consuming. Moreover, toilets onboard aircraft are not intended for such liquid disposal, and are not always readily available for such a practice.

Aircraft operators may also consider incorporating specialized complex and complicated plumbing systems that are specifically configured to treat and remove colored liquids into aircraft. Such systems provide separate and distinct plumbing systems that are separately assembled into the aircraft. However, such systems tend to be complex, expensive, add weight, and generate noise within the interior cabin.

SUMMARY OF THE DISCLOSURE

A need exists for a system and method of draining colored liquids from galley sinks without the need for a separate and distinct specialized plumbing system. Further, a need exists for a system and method that utilizes existing plumbing of a galley onboard a vehicle to remove coloration pigment from drained liquids.

With those needs in mind, certain embodiments of the present disclosure provide a drainage system for a galley of a vehicle. The drainage system includes a sink that is configured to receive a liquid. A liquid pigment remover is in fluid communication with the sink. The liquid pigment remover is configured to remove color from the liquid. A drain is in fluid communication with the liquid pigment remover. The drain is configured to pass the liquid overboard from the vehicle after the pigment is removed from the liquid by the liquid pigment remover.

In at least one embodiment, the drainage system also includes a strainer that is configured to strain particulates (for example, serve as a trap or a settling tank for grease and food particles) from the liquid before the liquid passes out of the vehicle. The strainer may be disposed between the sink and the drain upstream from the liquid pigment remover. Optionally, the strainer may be disposed between the sink and the drain downstream from the liquid pigment remover. In at least one embodiment, the liquid pigment remover is within the strainer. For example, the strainer may include a housing that removably retains the liquid pigment remover.

In at least one embodiment, the liquid pigment remover includes a pigment-removing filter. The pigment-removing filter may include activated charcoal elements.

In at least one embodiment, the liquid pigment remover includes a main body including a rear wall, a front wall, and a perimeter wall. An interior chamber is defined between the rear wall, the front wall, and the perimeter wall. A liquid-receiving channel is formed within the interior chamber. A liquid inlet is formed through a top portion of the perimeter wall. The liquid inlet is in fluid communication with the liquid-receiving channel. A liquid outlet is formed through a portion of the perimeter wall. A pigment-removing filter is disposed within the interior chamber below and around sides of the liquid-receiving channel. The perimeter wall may include an overflow channel.

Certain embodiments of the present disclosure provide a drainage method for a galley of a vehicle. The drainage method includes depositing liquid within a sink, removing color from the liquid by a liquid pigment remover that is in fluid communication with the sink, and passing the liquid overboard the vehicle via a drain that is in fluid communication with the liquid pigment remover after the removing. The drainage method may also include straining particulates (for example, providing a trap or a settling tank for grease and food particles) from the liquid by a strainer before the passing.

Certain embodiments of the present disclosure provide a vehicle that includes an interior cabin, a galley within the interior cabin, and a drainage system that is configured to drain liquid overboard out of the vehicle from the galley.

BRIEF DESCRIPTION OF THE DRAWINGS

FIG. 3 illustrates an internal front view of a liquid pigment remover, according to an embodiment of the present disclosure.

FIG. 4 illustrates an internal lateral view of a liquid pigment remover, according to an embodiment of the present disclosure.

FIG. 5 illustrates a lateral view of a liquid pigment remover, according to an embodiment of the present disclosure.

DETAILED DESCRIPTION OF THE DISCLOSURE

Figure 1:
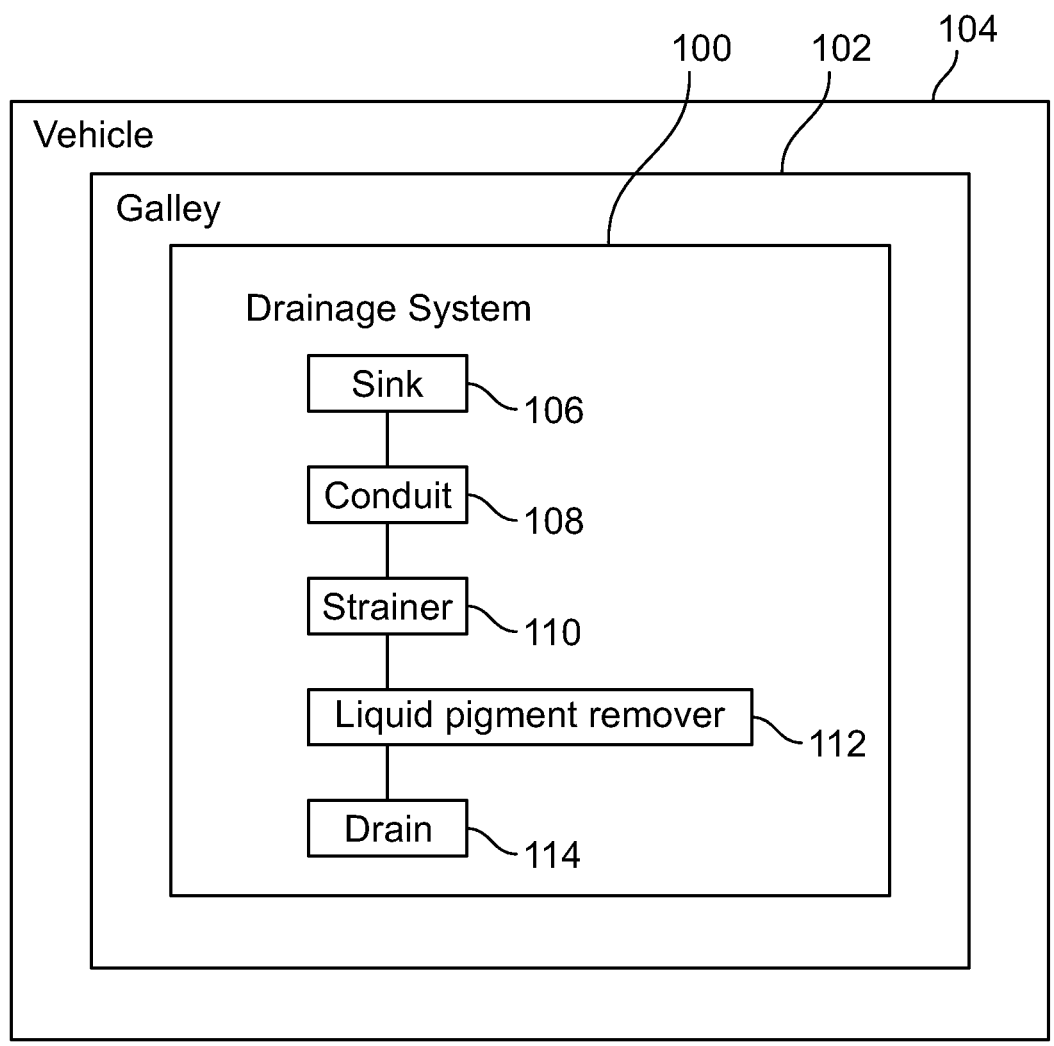
FIG. 1 illustrates a schematic block diagram of a drainage system of a galley onboard a vehicle, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a drainage system for a galley of a vehicle. The drainage system is configured to remove coloration/pigment from fluids prior to the fluids being drained overboard out of the vehicle. The drainage system includes a drain (such as an overboard drain mast), and a liquid pigment remover. In at least one embodiment, the liquid pigment remover is or otherwise includes a replaceable filter cartridge that is configured to remove at least some pigment from a colorful liquid (such as red wine, coffee, cola, dark-colored liquor, such as whiskey, and/or the like). The drainage system includes an input region, such as a sink, which receives the liquid (for example, an individual may pour the liquid into the sink). The sink is fluidly connected to a liquid pigment remover, which may be disposed within a conduit that connects the sink to the liquid pigment remover. The drainage system may also include a strainer, which may be upstream or downstream from the liquid pigment remover. In at least one embodiment, the liquid pigment remover may be a filter cartridge that is disposed within the strainer. In at least one embodiment, the liquid pigment remover includes an activated charcoal filter.

Certain embodiments of the present disclosure provide a method of draining liquid overboard from a vehicle. The method includes depositing a liquid into an input portion (such as a sink), passing the liquid through a strainer to remove incidental particulates of a target size, passing the liquid through a liquid pigment remover to remove and/or reduce color associated with the liquid, and draining the discolored liquid from the vehicle via a drain, such as a drain mast of an aircraft.

Embodiments of the present disclosure provide drainage systems and method that are environmentally-friendly, in that purer liquid is drained overboard from vehicles. Further, the drainage systems eliminate, minimize, or otherwise reduce staining of exterior portions of a vehicle from drained liquids. Also, the drainage systems and methods may be used with existing plumbing systems onboard vehicles (for example, the existing plumbing systems may be inexpensively retrofitted), and are substantially less complex, less costly, lighter, and quieter than separate and distinct liquid removal systems. Additionally, the liquid pigment remover and strainer are easily accessible for maintenance and/or replacement.

FIG. 1 illustrates a schematic block diagram of a drainage system 100 of a galley 102 onboard a vehicle 104, according to an embodiment of the present disclosure. The vehicle 104 may be an aircraft. Alternatively, the vehicle 104 may be a land-based vehicle (such as a bus, recreational vehicle (RV) or train car), a sea-based vehicle (such as a cruise ship), or the like.

The drainage system 100 includes an input region such as a sink 106 that is fluidly coupled to a conduit 108. The conduit 108 is part of a plumbing system that includes one or more pipes, tubes, and/or the like.

A strainer 110 is fluidly coupled to the conduit 108. For example, the strainer 110 may be disposed within the conduit 108. Optionally, the strainer 110 may be coupled between separate segments of the conduit 108. The strainer 110 is configured to strain and retain particulates (for example, grease and particles of food) from liquid that passes through the drainage system 100.

A liquid pigment remover 112 is fluidly coupled to the conduit 108. As an example, the liquid pigment remover 112 may be disposed within the conduit 108. As another example, the liquid pigment remover 112 may be coupled between separate segments of the conduit 108. In at least one embodiment, the liquid pigment remover 112 is disposed within the strainer 110. The liquid pigment remover 112 may be or include a filter, such as an activated carbon (for example, charcoal) filter. For example, the liquid pigment remover 112 may include an activated charcoal filter having activated charcoal elements.

Activated charcoal is charcoal that has been treated with oxygen to open millions of tiny pores between carbon atoms. Activated charcoal is used to adsorb odorous or colored substances from gases or liquids. When activated charcoal adsorbs a substance, the activated charcoal attaches to the substance by chemical attraction. The relatively large surface area of activated charcoal provides an almost countless number of bonding sites. When certain chemicals pass next to the carbon surface, they attach to the surface and are trapped.

Optionally, the liquid pigment remover 112 may include various other types of filters that are configured to remove color from a liquid. For example, the liquid pigment remover 112 may include sand, one or more chemicals, and/or the like that are configured to filter colored substances from a liquid as the liquid passes through the liquid pigment remover 112.

The drainage system 100 also includes an outlet such as a drain 114 downstream from the strainer 110 and the liquid pigment remover 112. As shown, the liquid pigment remover 112 may be downstream (for example, closer to the drain 114 than the sink 106) from the strainer 110. Optionally, the liquid pigment remover 112 may be upstream from the strainer 110. In at least one embodiment, the strainer 110 and the liquid pigment remover 112 may contained within a single housing or unit. Alternatively, the drainage system 100 may not include the strainer 110.

In operation, the sink 106 receives a liquid. For example, a vehicle attendant pours the liquid into the sink 106. The liquid passes out of the sink 106 and into the conduit 108. The liquid passes through the strainer 110, which strains particulates (such as grease and particles of food) from the liquid. As the liquid passes through the drainage system 100, the liquid pigment remover 112 removes coloration (either fully or partially) from the liquid. The liquid pigment remover 112 removes at least some (or all) of coloration (including pigmentation of a liquid, colored particulates suspended in the liquid, and/or the like) from the liquid. It is to be understood that recitation of removing color or pigment includes removing at least a portion (but not necessarily all) of coloration from the liquid. Optionally, in at least one embodiment, the liquid pigment remover 112 may remove all coloration from the liquid. For example, the liquid pigment remover 112 may be or otherwise include an activated charcoal filter that removes coloration from the liquid (such as red wine, coffee or color) before the liquid passes out of the drain 114. As such, liquid that drains out of drain 114 overboard out of the vehicle 104 is discolored (for example, an intensity of the color of the liquid is substantially if not completely diminished), thereby reducing the possibility that the drained liquid may stain an exterior of the vehicle 104.

Figure 2:
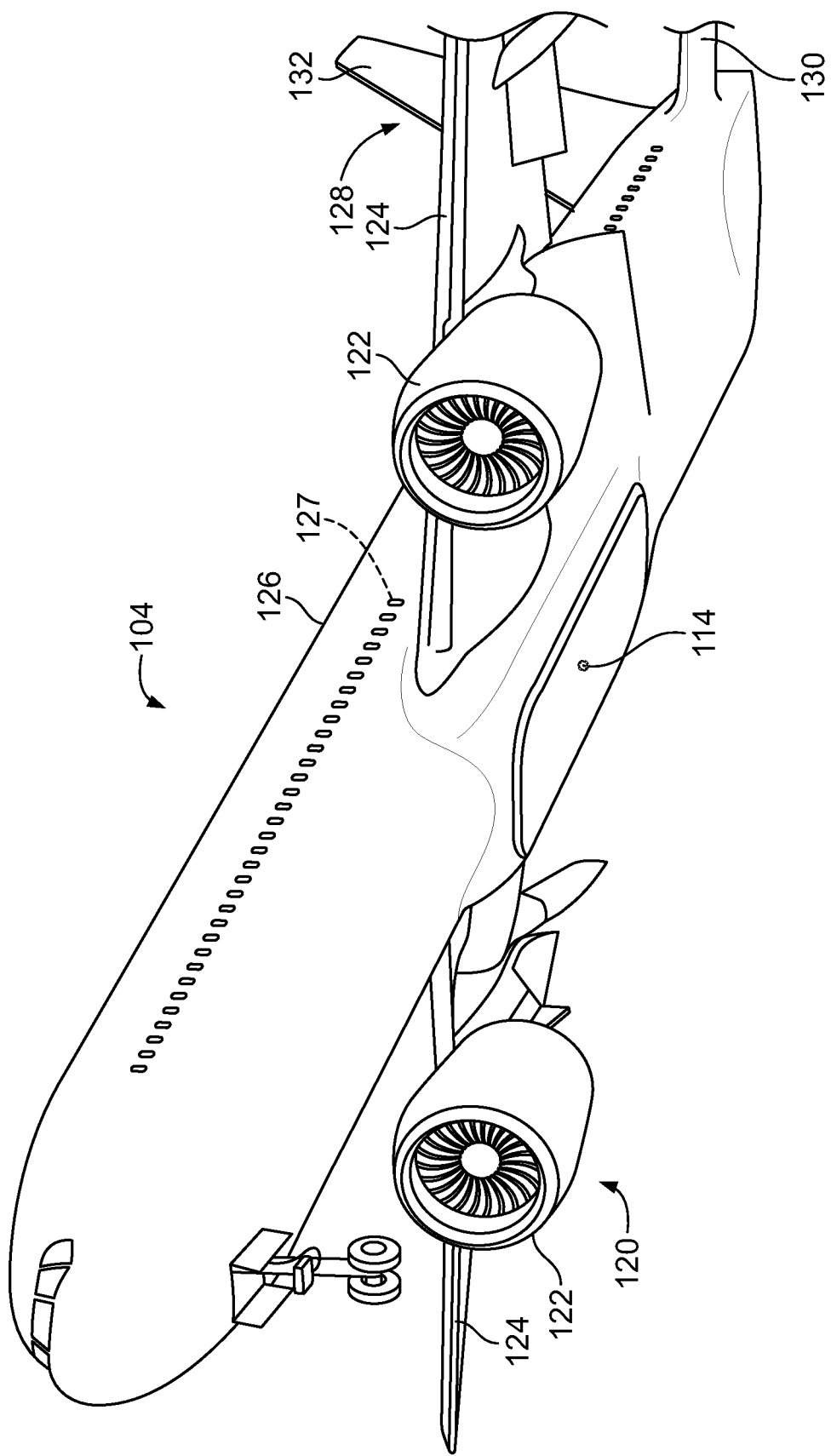
FIG. 2 illustrates a perspective view of a vehicle, such as an aircraft, according to an exemplary embodiment of the present disclosure.

FIG. 2 illustrates a perspective view of a vehicle, such as an aircraft 104, according to an exemplary embodiment of the present disclosure. The aircraft 104 includes a propulsion system 120 that may include two turbofan engines 122, for example. Optionally, the propulsion system 120 may include more engines 122 than shown. The engines 122 are carried by wings 124 of the aircraft 104. In other embodiments, the engines 122 may be carried by a fuselage 126 and/or an empennage 128. The empennage 128 may also support horizontal stabilizers 130 and a vertical stabilizer 132. The fuselage 126 defines an internal cabin 127, which may include one or more galleys.

As shown, the drain 114 may be positioned on an underside of the fuselage 126. In at least one embodiment, the drain 114 is a drain mast of a galley (such as the galley 102) onboard the aircraft 104. Referring to FIGS. 1 and 2, the drainage system 100 includes the liquid pigment remover 112, which removes coloration from liquid that drains out of the drain 114 of the aircraft 104. As such, the drainage system 100 eliminates, minimizes, or reduces stains from liquids that pass out of the drain 114.

Alternatively, instead of an aircraft, embodiments of the present disclosure may be used with various other vehicles, such as automobiles, buses, RVs, locomotives and train cars, seacraft, spacecraft, and the like.

FIG. 3 illustrates an internal front view of the liquid pigment remover 112, according to an embodiment of the present disclosure. The liquid pigment remover 112 includes a main body or housing 200 including a rear wall 202, a front wall (front wall not shown in FIG. 3), and a perimeter wall 204. An interior chamber 206 is defined between the rear wall 202, the front wall, and the perimeter wall 204. A liquid inlet 208 is formed through a top portion of the perimeter wall 204, while a liquid outlet 210 is formed through at least a portion of the perimeter wall 204. For example, the liquid outlet 210 may be formed around substantially all the perimeter wall 204 (such as a wall having perforations, mesh, a screen, and/or the like). As shown, the liquid inlet 208 and the liquid outlet 210 may be aligned with a central longitudinal axis 212 of the housing 200. Optionally, one or both of the liquid inlet 208 and/or the liquid outlet 210 may be offset from the longitudinal axis 212. Alternatively, the liquid inlet 208 and/or the liquid outlet 210 may be at least partially formed through the rear wall 202 or the front wall.

A liquid-receiving channel 214 is formed within the interior chamber 206. The liquid inlet 208 is in fluid communication with the liquid-receiving channel 214.

A pigment-removing filter 216 is disposed within the interior chamber 206 below and around sides of the liquid-receiving channel 214. In at least one embodiment, the pigment-removing filter 216 is an activated charcoal filter having activated charcoal elements 217. A fluid passage wall 218 (such as a screen, mesh, or the like) may separate the pigment-removing filter 216 from the liquid-receiving channel 214, and securely fix the pigment-removing filter 216 within the interior chamber 206. As shown, the pigment-removing filter 216 is underneath and on both sides of the liquid-receiving channel 214. The pigment-removing filter 216 may not extend above the liquid-receiving channel 214. In at least one other embodiment, the pigment-removing filter 216 may also extend above the liquid-receiving channel 214 between the liquid inlet 208 and the liquid-receiving channel 214. Further, the pigment-removing filter 216 may be larger or smaller than shown. For example, pigment-removing filter 216 may extend further into the interior chamber 206 than shown. In at least one embodiment, the liquid pigment remover 112 may not include the liquid-receiving channel 214. Instead, the pigment-removing filter 216 may occupy all (or substantially all) of the interior chamber 206.

As shown in FIG. 3, at least a portion of the perimeter wall 204 may include at least one flat portion 204'. The flat portion 204' is configured to abut against a reciprocal portion of a housing (such as coupled to the conduit 108, and/or of the strainer 110). In this manner, the flat segment 204' and the reciprocal portion cooperate to properly locate the liquid pigment remover 112 within the housing, and prevent the liquid pigment remover 112 from rotating within the housing. Alternatively, the perimeter wall 204 may not include the flat portion 204'.

FIG. 4 illustrates an internal lateral view of the liquid pigment remover 112, according to an embodiment of the present disclosure. In at least one embodiment, the pigment-removing filter 216 may extend over the rear wall 202 within the interior chamber 206. The color removing filter 216 may extend between the rear wall 202 and the front wall 220 within the interior chamber 206 below the liquid-receiving channel 214.

Referring to FIGS. 1, 3, and 4, liquid that passes through an input region (such as the sink 106) enters into the liquid-receiving channel 214 via the liquid inlet 208 in the direction of arrow A. The liquid passes down into the pigment-removing filter 216 (such as via gravity). The pigment-removing filter 216 removes color from the liquid as the liquid passes therethrough. For example, the pigment-removing filter 216 is an activated charcoal filter that removes color from the liquid. Activated charcoal elements 217 of the pigment-removing filter 216 adsorb colored substances from the liquid. The relatively large surface area of the activated charcoal elements 217 provides bonding sites to which colored substances within the liquid attach. The colored substances from the liquid attach to the activated charcoal elements 217 and are trapped within the pigment-removing filter 216. In this manner, the pigment-removing filter 216 removes color from the liquid, and the discolored (for example, fully clear or partially discolored) liquid passes through the pigment-removing filter 216, into and through the liquid outlet 210, and out of the drain 114.

FIG. 5 illustrates a lateral view of the liquid pigment remover 112, according to an embodiment of the present disclosure. The perimeter wall 204 may include an overflow channel 230. The overflow channel 230 may extend around the perimeter wall 204. The overflow channel 230 is configured to receive overflow liquid that passes onto and/or into the main body 200. Optionally, the perimeter wall 204 may not include the overflow channel 230. For example, the drainage system 100 (shown in FIG. 1) may include a flow restrictor or limiter that prevents or otherwise reduces potential liquid overflow.

Referring to FIGS. 1 and 3-5, the liquid pigment remover 112 may be disposed within the conduit 108, or a structural housing coupled to the conduit 108 (such as an enclosure connecting segments of the conduit 108). In at least one other embodiment, the liquid pigment remover 112 may be disposed within the strainer 110.

Figure 6:
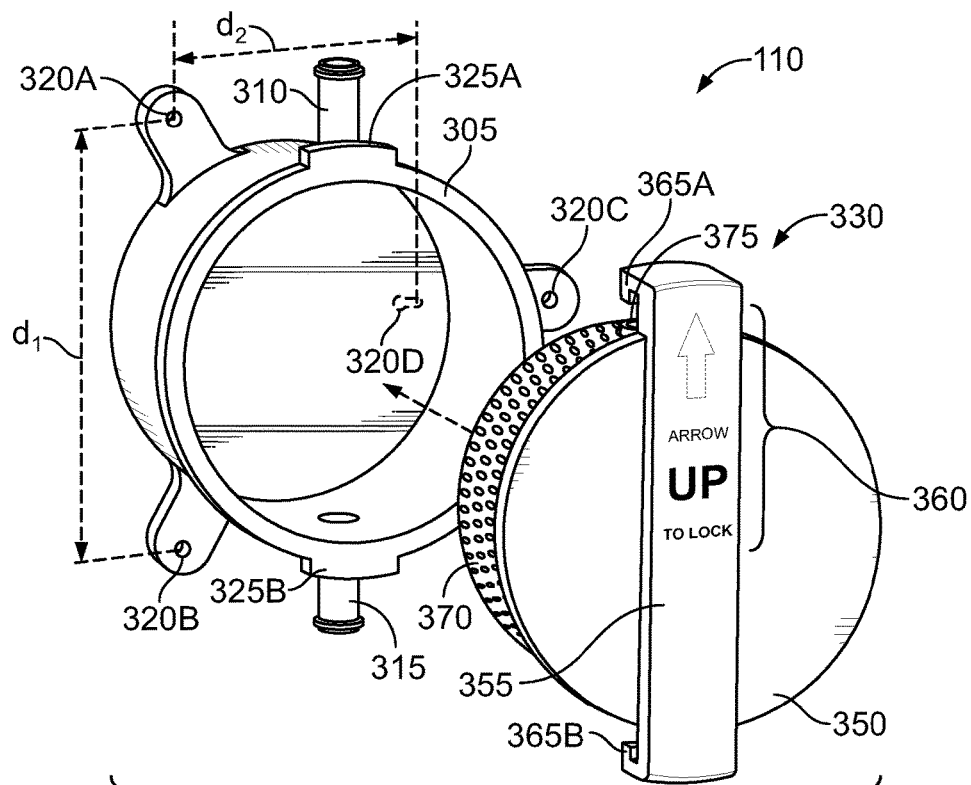
FIG. 6 illustrates a perspective view of one example of a strainer, such as a drain strainer assembly, according to an embodiment of the present disclosure.
Figure 7:
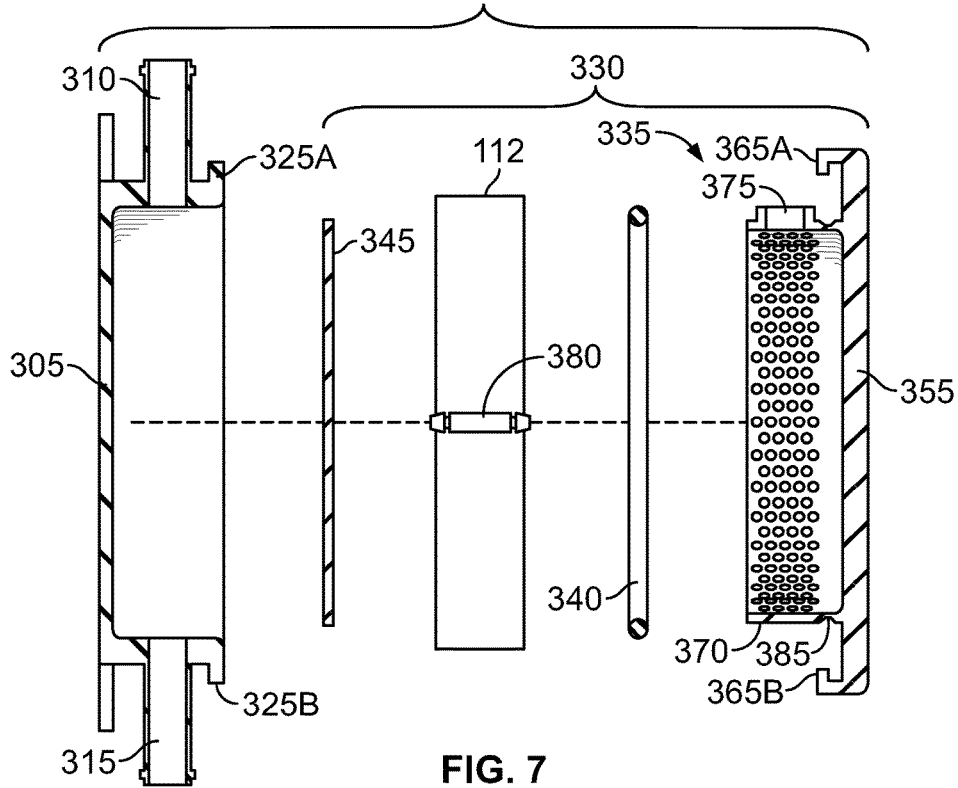
FIG. 7 illustrates an exploded cross-sectional view of a strainer, such as a drain strainer assembly, according to an embodiment of the present disclosure.

FIG. 6 illustrates a perspective view of one example of the strainer 110, such as a drain strainer assembly, according to an embodiment of the present disclosure. FIG. 7 illustrates an exploded cross-sectional view of the drain strainer assembly 110. Referring to FIGS. 6 and 7, the drain strainer assembly 110 includes a housing 305 having an inlet 310 and an outlet 315. The housing 305 has a generally circular cross-section. In at least one embodiment, the liquid pigment remover 112 (shown in FIG. 7, for example) is contained within the housing 305. The housing 305 may be opened to remove and replace the liquid pigment remover 112. In this manner, the liquid pigment remover 112 may be removably retained by the housing 305 of the drain strainer assembly 110. The housing 305 also includes a plurality of primary mounting holes 320A-C and an optional secondary mounting hole 320D through which suitable fasteners may be inserted to secure the housing 305 to a structure, such as a support wall of a galley. The optional secondary mounting hole 320D may be configured as a key slot. The housing 305 also includes a plurality of engagement tabs 325A-B.

In the example shown in FIGS. 6 and 7, the two left primary mounting holes 320A-B are aligned vertically and separated by a first distance, $d_1$. The optional secondary mounting hole 320D is laterally offset from the two left mounting holes 320A-B by a second distance, $d_2$. This configuration advantageously enables the drain strainer assembly 110 (which may contain the liquid pigment remover 112) to replace an existing drain strainer assembly quickly and easily as a retrofit in an existing galley, if desired, using the same attachment points to secure the new drain strainer assembly 110 to the support wall. For retrofit installations, the mounting tab surrounding mounting hole 320C may be completely removed, to allow the drain strainer assembly 110 to match the mounting space footprint of the existing drain strainer assembly on the support wall. In new installations that are not retrofits, the drain strainer assembly 110 may be attached to a structure using the primary mounting holes 320A-C.

The drain strainer assembly 110 may also include a strainer member assembly 330 including a strainer member 335, a sealing member 340, a strainer disk 345, and a fastener 380. In the example shown in FIGS. 6 and 7, the strainer member 335 has a solid front surface 350 with a handle 355 having a label 360 indicating the correct orientation of the strainer member assembly 330 within the housing 305. The solid front surface 350 may include any suitable material that is liquid impermeable. The strainer member 335 also includes a plurality of engagement tabs 365A-B configured to mate with the engagement tabs 325A-B of the housing 305. The strainer member engagement tabs 365A-B and housing engagement tabs 325A-B may be arranged in a radially symmetric pattern. The interface between the strainer member 335 and the housing 305 may include a wide variety of additional or alternative fluid-tight connections, such as, for example, a threaded connection.

Additionally, the strainer member 335 includes cylindrical strainer sidewalls 370 with an upper conduit 375 configured to align with the inlet 310 of the housing 305 when the strainer member assembly 330 is inserted into the housing 305. When the strainer member assembly 330 is fully assembled, the strainer disk 345 is attached to the strainer member 335 with a suitable fastener 380, such as the attachment pin shown in FIG. 7, to cover the circular opening at the back of the strainer member 335 defined by the cylindrical strainer sidewalls 370. As shown, the sealing member 340 may include a circular O-ring located within a corresponding groove 385 in the cylindrical strainer sidewalls 370 of the strainer member 335.

Figure 8:
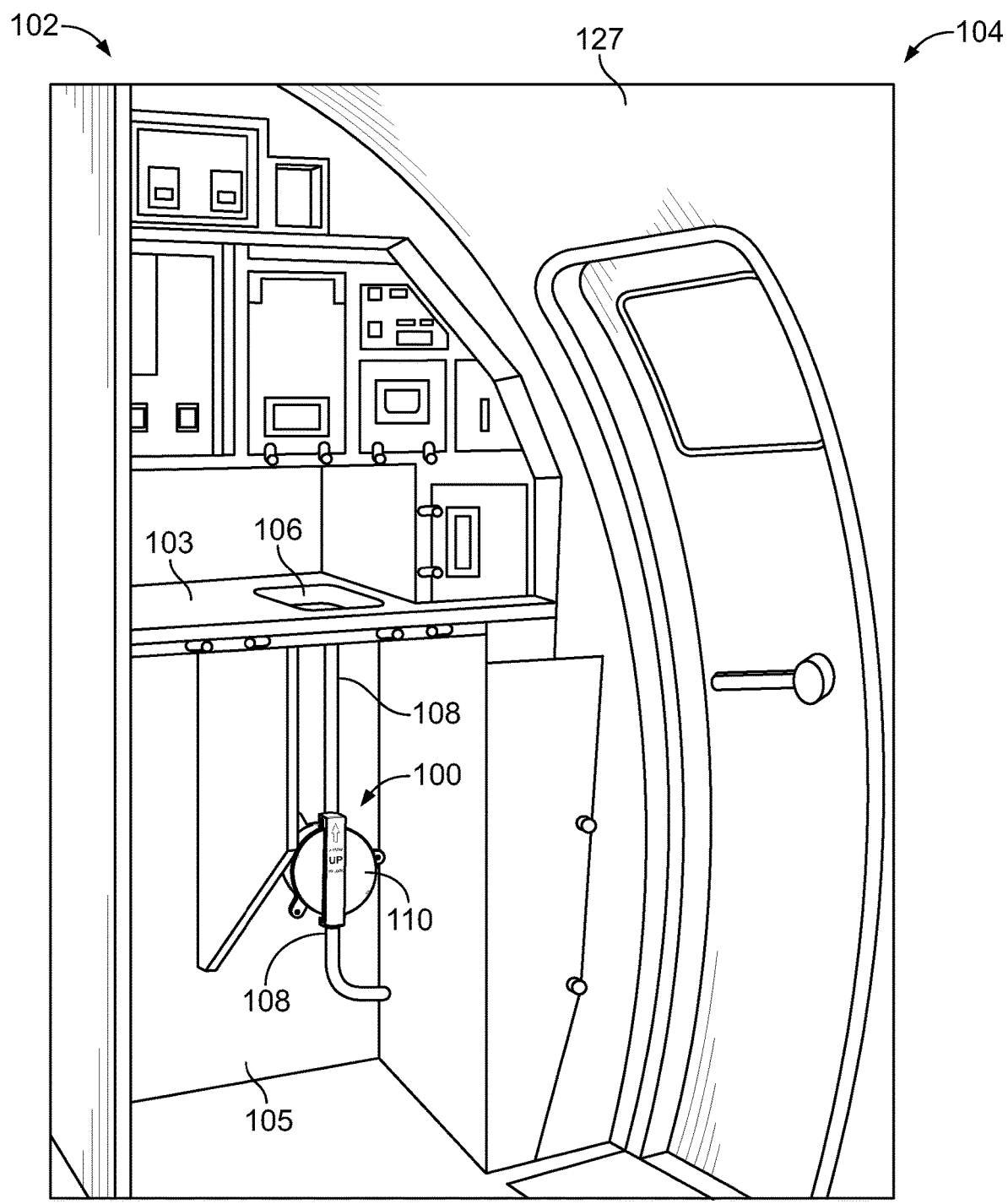
FIG. 8 illustrates a perspective view of a galley having a drainage system, according to an embodiment of the present disclosure.

FIG. 8 illustrates a perspective view of a galley 102 having a drainage system 100, according to an embodiment of the present disclosure. Referring to FIGS. 1 and 6-8, in operation, the drain strainer assembly 110 can be installed in the galley 102 of the vehicle 104, such as an aircraft. As shown, the galley 102 may include a counter surface 103 having a catch basin such as the sink 106 (having a sink drain) disposed therein. The catch basin 106 is coupled to the conduit 108, which may be secured to a support wall 105. The drain strainer assembly 110 is attached to the support wall 105, and the inlet 310 is fluidly coupled to the conduit 108 (such as a first segment of the conduit 108). The outlet 315 of the drain strainer assembly 110 is fluidly coupled to the conduit 108 (such as a second segment of the conduit), which leads away from the drain strainer assembly 110 to the drain 114.

The strainer member assembly 330 can be inserted into the housing 305 and secured by turning the handle 355 such that the engagement tabs 365A-B of the strainer member assembly 330 interlock with the engagement tabs 325A-B of the housing 305, in the orientation indicated by the label 360. In this configuration, the upper conduit 375 of the strainer member assembly 330 is aligned with the inlet 310 of the housing 305, and the sealing member 340 provides a fluid-tight seal between the strainer member assembly 330 and the housing 305. Waste liquids may then flow through the conduit 108 into the drain strainer assembly 110 through the inlet 310 and the upper conduit 375, and the strainer member assembly 330 may capture grease, relatively large debris and particulate matter from the waste fluid. In at least one embodiment, the liquid pigment remover 112 is contained with the drain strainer assembly 110, and removes color from the waste fluid, as described above. The resulting strained (and discolored) fluid may then flow out of the strainer member assembly 330 through the outlet 315 of the housing 305 into the conduit 108.

The drain strainer assembly 110 may be sized and shaped differently than shown. In at least one embodiment, the drain strainer assembly 110 defines an internal chamber that is configured to securely retain the liquid pigment remover 112. Alternatively, the liquid pigment remover 112 may be separate and distinct from the drain strainer assembly 110. Examples of the drain strainer assembly 110 are further described in U.S. Pat. No. 9,440,316, entitled "Circular Galley Drain Strainer," which is hereby incorporated by reference in its entirety.

Figure 9:
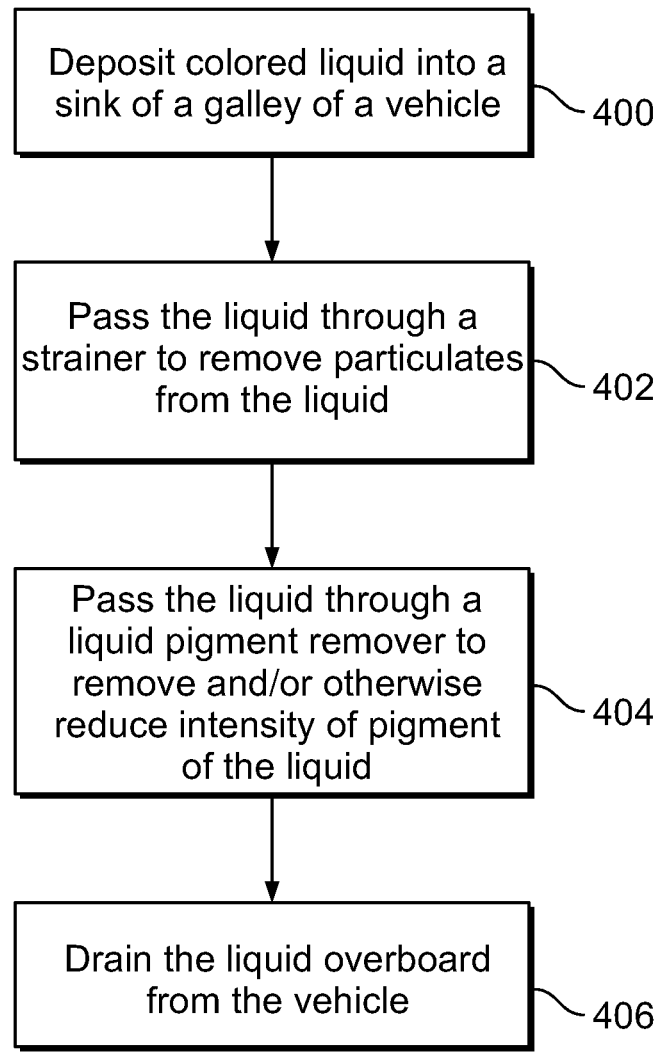
FIG. 9 illustrates a flow chart of a method of draining liquid from a galley of a vehicle, according to an embodiment of the present disclosure.

FIG. 9 illustrates a flow chart of a method of draining liquid from a galley of a vehicle, according to an embodiment of the present disclosure. Referring to FIGS. 1 and 9, the method begins at 400, at which colored liquid is deposited into the sink 106 of the galley 102 of the vehicle 104. The colored liquid passes from the sink to the strainer 110 via the conduit 108. At 402, the liquid passes through the strainer 110 to remove grease, food, and other such particulates from the liquid. Optionally, the method may not include 402.

At 404, the colored liquid passes through the liquid pigment remover 112 (which is fluidly coupled to the sink 106 via the conduit 108) to remove and/or otherwise reduced colored substances from the liquid, thereby reducing pigment (for example, intensity of pigment) from the liquid. At 406, at least partially uncolored liquid (that is, liquid that has been treated by the liquid pigment remover 112) is then drained from the vehicle through the drain 114, which is fluidly coupled to the liquid pigment remover 112 via the conduit 108.

As described herein, embodiments of the present disclosure provide systems and methods of draining colored liquids from galley sinks without the need for a separate and distinct specialized plumbing system. Further, embodiments of the present disclosure provide systems and methods that may utilize existing plumbing of a galley onboard a vehicle to remove coloration from drained liquids. By removing color from the liquids before draining overboard out of a vehicle, embodiments of the present disclosure eliminate, minimize, or otherwise reduce stains on the exterior of the vehicle that may otherwise be caused by colored drained liquids.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A drainage system for a galley of a vehicle, the drainage system comprising:
    a sink that is configured to receive a liquid;
    a liquid pigment remover that is in fluid communication with the sink, wherein the liquid pigment remover is configured to remove color from the liquid, wherein the liquid pigment remover comprises: (a) a main body including a rear wall, a front wall, and a perimeter wall, wherein an interior chamber is defined between the rear wall, the front wall, and the perimeter wall, wherein a liquid-receiving channel is formed within the interior chamber, (b) a liquid inlet formed through a top portion of the perimeter wall, wherein the liquid inlet is in fluid communication with the liquid-receiving channel, (c) a liquid outlet formed through a portion of the perimeter wall, and (d) a pigment-removing filter disposed within the interior chamber below and around sides of the liquid-receiving channel; and
    a drain that is in fluid communication with the liquid pigment remover, wherein the drain is configured to pass the liquid overboard from the vehicle after the color is removed from the liquid by the liquid pigment remover.

2. The drainage system of claim 1, further comprising a strainer that is configured to strain particulates from the liquid before the liquid passes overboard out of the vehicle.

3. The drainage system of claim 2, wherein the strainer is disposed between the sink and the drain upstream from the liquid pigment remover.

4. The drainage system of claim 2, wherein the strainer is disposed between the sink and the drain downstream from the liquid pigment remover.

5. The drainage system of claim 2, wherein the liquid pigment remover is within the strainer.

6. The drainage system of claim 2, wherein the strainer comprises a housing that removably retains the liquid pigment remover.

7. The drainage system of claim 1, wherein the pigment-removing filter comprises activated charcoal elements.

8. The drainage system of claim 1, wherein the perimeter wall comprises an overflow channel.

9. A drainage method for a galley of a vehicle, the drainage method comprising:
    depositing colored liquid within a sink;
    removing color pigment from the liquid by a liquid pigment remover that is in fluid communication with the sink, wherein the liquid pigment remover comprises: (a) a main body including a rear wall, a front wall, and a perimeter wall, wherein an interior chamber is defined between the rear wall, the front wall, and the perimeter wall, wherein a liquid-receiving channel is formed within the interior chamber, (b) a liquid inlet formed through a top portion of the perimeter wall, wherein the liquid inlet is in fluid communication with the liquid-receiving channel, (c) a liquid outlet formed through a portion of the perimeter wall, and (d) a pigment-removing filter disposed within the interior chamber below and around sides of the liquid-receiving channel; and passing the liquid overboard out of the vehicle via a drain that is in fluid communication the liquid pigment remover after the removing.

10. The drainage method of claim 9, further comprising straining particulates from the liquid by a strainer before the passing.

11. The drainage method of claim 10, wherein the straining occurs before the removing.

12. The drainage method of claim 10, further comprising removably retaining the liquid pigment remover within the strainer.

13. The drainage method of claim 9, wherein the removing comprises using the pigment-removing filter of the liquid pigment remover to remove the color from the liquid.

14. The drainage method of claim 9, wherein the pigment-removing filter comprises activated charcoal elements.

15. The drainage method of claim 9, wherein the perimeter wall comprises an overflow channel.

16. A vehicle comprising:
an internal cabin;
a galley within the internal cabin; and
a drainage system that is configured to drain liquid overboard from the vehicle from the galley, the drainage system comprising:
　a sink that is configured to receive colored liquid;
　a liquid pigment remover that is in fluid communication with the sink, wherein the liquid pigment remover is configured to remove color from the colored liquid, wherein the liquid pigment remover comprises a pigment-removing filter having a plurality of activated charcoal elements, wherein the liquid pigment remover comprises: (a) a main body including a rear wall, a front wall, and a perimeter wall, wherein an interior chamber is defined between the rear wall, the front wall, and the perimeter wall, wherein a liquid-receiving channel is formed within the interior chamber, (b) a liquid inlet formed through a top portion of the perimeter wall, wherein the liquid inlet is in fluid communication with the liquid-receiving channel, (c) a liquid outlet formed through a portion of the perimeter wall, and (d) a pigment-removing filter disposed within the interior chamber below and around sides of the liquid-receiving channel;
　a strainer that is configured to strain particulates from the liquid; and
　a drain that is in fluid communication with the liquid coloration, wherein the drain is configured to pass the liquid overboard from the vehicle after the color is removed from the colored liquid by the liquid pigment remover and the particulates are strained form the liquid.

17. The vehicle of claim 16, wherein the strainer is disposed between the sink and the drain upstream or downstream from the liquid pigment remover.

18. The vehicle of claim 16, wherein the liquid pigment remover is removably retained within a housing of the strainer.

19. The vehicle of claim 16, wherein the perimeter wall comprises an overflow channel.

20. The drainage method of claim 10, wherein the straining occurs after the removing.

* * * * *